(12) United States Patent
Roeder

(10) Patent No.: US 7,003,287 B2
(45) Date of Patent: Feb. 21, 2006

(54) SYSTEM AND METHOD FOR CALL FORWARDING IN A COMMUNICATION SYSTEM

(75) Inventor: G. R. Konrad Roeder, Colorado Springs, CO (US)

(73) Assignee: Siemens AG, Munich (DE)

( * ) Notice: Subject to any disclaimer, the term of this patent is extended or adjusted under 35 U.S.C. 154(b) by 707 days.

(21) Appl. No.: 09/782,133

(22) Filed: Feb. 12, 2001

(65) Prior Publication Data

US 2002/0111176 A1 Aug. 15, 2002

(51) Int. Cl.
*H04M 3/42* (2006.01)

(52) U.S. Cl. ............... 455/417; 455/414.1; 455/445; 455/446; 455/554.2; 379/211.01; 379/211.02

(58) Field of Classification Search ........... 455/414.1, 455/445, 466, 554.1, 554.2, 417; 370/325, 370/352, 356; 379/211.01, 211.02, 211.03, 379/211.04

See application file for complete search history.

(56) References Cited

U.S. PATENT DOCUMENTS

| | | | |
|---|---|---|---|
| 4,980,907 A | | 12/1990 | Raith et al. ............ 379/63 |
| 5,206,901 A | * | 4/1993 | Harlow et al. ......... 379/211.04 |
| 5,235,632 A | | 8/1993 | Raith ................... 379/59 |

(Continued)

FOREIGN PATENT DOCUMENTS

WO  WO99-59353  * 11/1999

OTHER PUBLICATIONS

Call Diversion Supplementary Services for H.323; ITU–T Recommendation H.450.3 Series H: Audiovisual and Multimedia Systems, Supplementary service for multimedia, Feb. 1998, pp. 1–68.

Korpi, et al. "Supplementary Services in the H.323 IP Telephony Network" IEEE Communications Magazine, IEEE Services Center, Piscataway, NJ, Jul. 1999, pp. 118–125.

Liao, et al. "Volp Mobility in IP/Cellular Network Internetworking" IEEE Communications Magazine, IEEE Service Center, Piscataway, NJ, Apr. 2000, pp. 70–75.

(Continued)

*Primary Examiner*—Stephen M. D'Agosta

(57) ABSTRACT

In one aspect of the invention, a system for call forwarding includes a telephone subsystem operable to communicate with a telephonic device. The system also includes a wireless subsystem operable to communicate with a mobile station. The mobile station is associated with the telephonic device. The system further includes a packet subsystem coupled to the telephone subsystem and the wireless subsystem. The packet subsystem is operable to instruct the telephone subsystem to forward a telephone call directed at the telephonic device to the packet subsystem after the mobile station registers with the wireless subsystem. The packet subsystem is also operable to communicate the telephone call to the wireless subsystem for delivery to the mobile station.

33 Claims, 5 Drawing Sheets

U.S. PATENT DOCUMENTS

| | | | |
|---|---|---|---|
| 5,353,331 A | | 10/1994 | Emery et al. ................. 379/58 |
| 5,440,613 A | | 8/1995 | Fuentes ....................... 379/60 |
| 5,448,619 A | | 9/1995 | Evans et al. .................. 379/58 |
| 5,454,032 A | * | 9/1995 | Pinard et al. .......... 379/167.05 |
| 5,475,689 A | | 12/1995 | Kay et al. ................. 370/95.3 |
| 5,506,887 A | | 4/1996 | Emery et al. ................. 379/58 |
| 5,537,610 A | | 7/1996 | Mauger et al. ............... 379/58 |
| 5,629,974 A | | 5/1997 | Rajala et al. .................. 379/58 |
| 5,664,005 A | | 9/1997 | Emery et al. ............... 455/422 |
| 5,713,073 A | | 1/1998 | Warsta ...................... 455/56.1 |
| 5,729,599 A | * | 3/1998 | Plomondon et al. ... 379/211.02 |
| 5,734,699 A | | 3/1998 | Lu et al. ........................ 379/58 |
| 5,742,596 A | * | 4/1998 | Baratz et al. ............... 370/356 |
| 5,742,905 A | | 4/1998 | Pepe et al. .................. 455/461 |
| 5,764,955 A | | 6/1998 | Doolan ....................... 395/500 |
| 5,771,465 A | | 6/1998 | Böjeryd ...................... 455/554 |
| 5,793,762 A | | 8/1998 | Penners et al. ............. 370/389 |
| 5,794,009 A | | 8/1998 | Coleman et al. ............ 395/500 |
| 5,839,067 A | | 11/1998 | Jonsson ...................... 455/422 |
| 5,862,481 A | | 1/1999 | Kulkarni et al. ............ 455/432 |
| 5,873,031 A | | 2/1999 | Griffith et al. .............. 455/412 |
| 5,887,256 A | | 3/1999 | Lu et al. ...................... 455/426 |
| 5,890,064 A | * | 3/1999 | Widergen et al. ........... 455/445 |
| 5,901,352 A | | 5/1999 | St-Pierre et al. ............ 455/426 |
| 5,901,359 A | | 5/1999 | Malmstrom ................. 455/461 |
| 5,924,030 A | | 7/1999 | Rautiola et al. ............. 455/426 |
| 5,943,619 A | | 8/1999 | Coyne et al. ............... 455/433 |
| 5,953,322 A | * | 9/1999 | Kimball ...................... 370/328 |
| 5,953,651 A | | 9/1999 | Lu et al. ...................... 455/408 |
| 5,956,331 A | | 9/1999 | Rautiola et al. ............. 370/338 |
| 5,960,004 A | | 9/1999 | Ramström et al. .......... 379/469 |
| 5,960,344 A | | 9/1999 | Mahany ...................... 455/432 |
| 5,978,673 A | | 11/1999 | Alperovich et al. ........ 455/417 |
| 5,999,810 A | | 12/1999 | Fuentes ...................... 455/422 |
| 5,999,813 A | | 12/1999 | Lu et al. ...................... 455/435 |
| H1836 H | | 2/2000 | Fletcher et al. ............. 455/433 |
| H1837 H | | 2/2000 | Fletcher et al. ............. 455/433 |
| 6,134,314 A | | 10/2000 | Dougherty et al. ......... 379/207 |
| 6,154,650 A | | 11/2000 | Abidi et al. ................. 455/433 |
| 6,266,523 B1 | * | 7/2001 | Cook et al. ................. 455/403 |
| 6,426,942 B1 | * | 7/2002 | Sienel et al. ................ 370/235 |
| 6,539,237 B1 | * | 3/2003 | Sayers et al. ............... 455/555 |
| 6,600,735 B1 | * | 7/2003 | Iwama et al. ............... 370/352 |

OTHER PUBLICATIONS

"A 'Plug and Play' Wireless Architecture Supporting Packet Data and IP Voice/Multimedia Services," U.S. Appl. No. 09/128,553, Inventors: Patrick Apfel, et al., Aug. 3, 1998.

"Method and System for Interworking Voice Bearer Messages Between Circuit–Switched and Packet–Switched Networks," U.S. Appl. No. 09/499,921, Inventors: James Lyon, et al.

ITU–T Recommendation H.323.

ITU–T Recommendation H.225.0, Nov. 16, 2000.

"System and Method for Call Forwarding Synchronization in a Communication System," U.S. Appl. No. 09/781,927, Inventor: G. R. Konrad Roeder, Feb. 12, 2001.

* cited by examiner

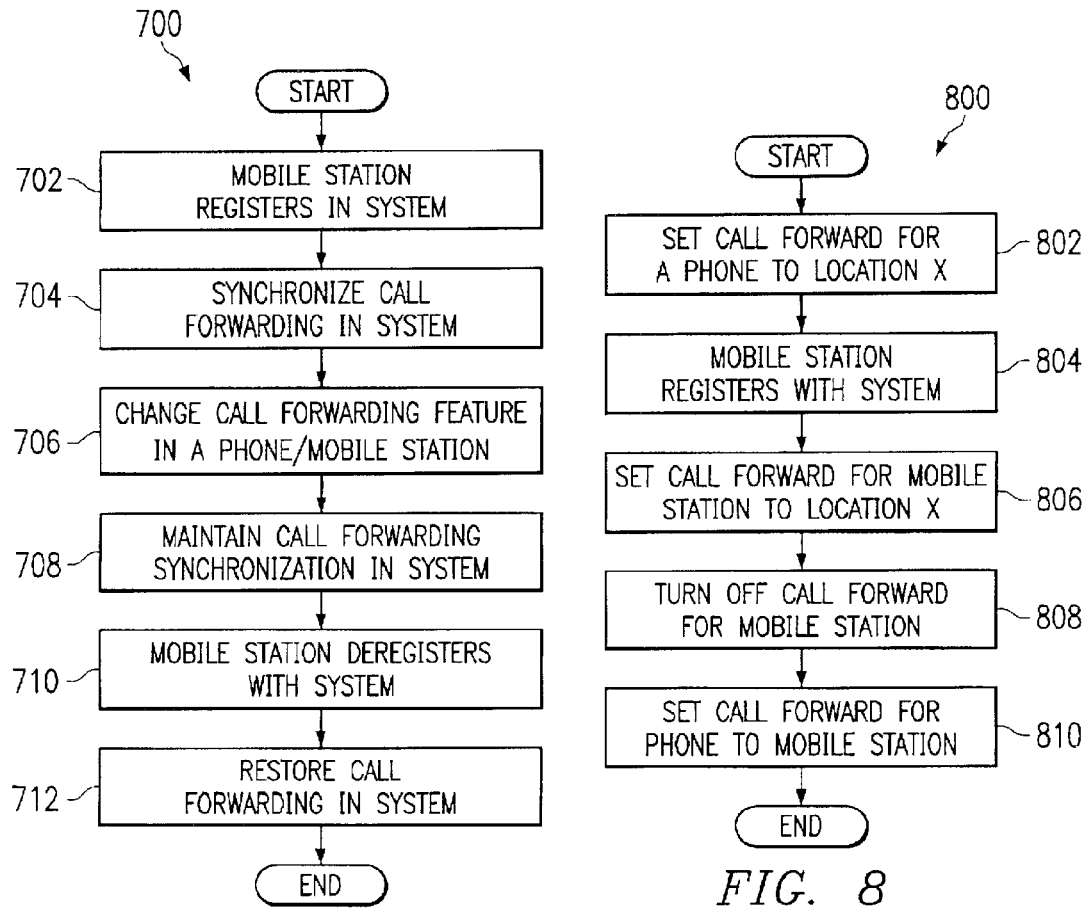
FIG. 7
FIG. 8
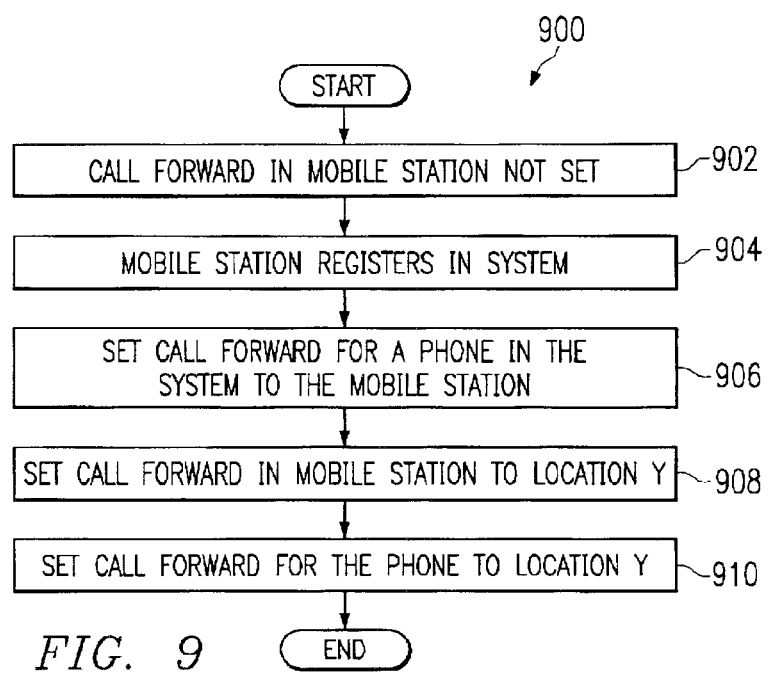
FIG. 9

SYSTEM AND METHOD FOR CALL FORWARDING IN A COMMUNICATION SYSTEM

CROSS-REFERENCE TO OTHER APPLICATIONS

This application shares a common specification with U.S. application Ser. No. 09/781,927, filed on Feb. 12, 2001 for a "System and Method for Call Forwarding Synchronization in a Communication System."

TECHNICAL FIELD OF THE INVENTION

This invention relates generally to the field of communication systems, and more particularly to a system and method for call forwarding in a communication system.

BACKGROUND OF THE INVENTION

Call forwarding is a feature typically supported in many communication systems. Call forwarding allows a user in the communication system to forward telephone calls directed at one telephone device to another telephone device. To use the call forwarding feature, the user or "subscriber" typically needs to enter a code and instruct the telephone system where to forward the calls.

A problem with conventional communication systems is that the user typically needs to manually activate and deactivate the call forwarding feature. For example, an employee of a company may have a wireless mobile phone, also called a "mobile station," and a desk phone. To forward calls from the desk phone to the mobile phone, the employee needs to manually instruct the telephone system to forward calls for the desk phone to the mobile phone. If the employee wants to deactivate the call forwarding feature before leaving work, the employee must pick up a phone and manually deactivate the call forwarding feature in the telephone system. Because the user typically must activate and deactivate the call forwarding feature manually, the user may forget to turn the call forwarding feature on or off. Also, since the mobile phone and the desk phone may not be located in the same room, it may be impractical for the user to manually turn the call forwarding feature on or off. In addition, if the user leaves an area covered served by the communication system and the mobile phone deregisters from the system, the user cannot use the mobile phone to manually activate and deactivate the call forwarding feature. As a result, the user may receive calls at unwanted times or at unwanted telephones.

Another problem with conventional communication systems is that the user is typically associated with multiple telephone numbers and/or extension numbers. For example, an employee may be reached by dialing the employee's mobile phone number or the employee's desk phone number. Because the employee may forget to activate the call forwarding feature on one of the employee's telephones, a person attempting to contact the employee may need to dial multiple telephone numbers to reach the employee.

As a result of any of these or other disadvantages, previous call forwarding techniques have been inadequate in many communication systems.

SUMMARY OF THE INVENTION

In accordance with the present invention, a system and method for call forwarding in a communication system are provided that substantially eliminate or reduce disadvantages and problems associated with conventional systems. In particular, a communication system automatically forwards calls for a telephone in the communication system to a subscriber's mobile station when the mobile station registers in the system, and stops forwarding calls to the mobile station when the mobile station deregisters with the system.

According to one embodiment of the present invention, a system for call forwarding includes a telephone subsystem operable to communicate with a telephonic device. The system also includes a wireless subsystem operable to communicate with a mobile station. The mobile station is associated with the telephonic device. The system further includes a packet subsystem coupled to the telephone subsystem and the wireless subsystem. The packet subsystem is operable to instruct the telephone subsystem to forward a telephone call directed at the telephonic device to the packet subsystem after the mobile station registers with the wireless subsystem. The packet subsystem is also operable to communicate the telephone call to the wireless subsystem for delivery to the mobile station.

In another embodiment of the invention, a method for call forwarding includes allowing a telephone subsystem to direct a first telephone call to a telephonic device when a mobile station is not registered. The mobile station is associated with the telephonic device. The method also includes detecting the mobile station registering with a wireless subsystem. The wireless subsystem is coupled to the telephone subsystem by a packet subsystem. The method further includes instructing the telephone subsystem to forward a second telephone call directed at the telephonic device to the packet subsystem. The packet subsystem is operable to receive the second telephone call from the telephone subsystem and to communicate the second telephone call to the wireless subsystem for delivery to the mobile station.

In yet another embodiment of the invention, a system for call forwarding includes a telephone subsystem operable to communicate with a telephonic device. The system also includes a client associated with the telephonic device and operable to operate in an active state and a non-active state. The active state indicates that calls to the telephonic device should be forwarded to the client, and the non-active state indicates that calls to the client should be forwarded to the telephonic device. The system further includes a gateway operable to communicate with the client and the telephone subsystem. In addition, the system includes a gatekeeper operable to instruct the telephone subsystem to forward a first telephone call directed at the telephonic device to the gateway when the client is operating in the active state. The gatekeeper is further operable to instruct the gateway to forward a second telephone call directed at the client to the telephone subsystem when the client is operating in the non-active state.

Numerous technical advantages are provided according to various embodiments of the present invention. Particular embodiments of the invention may exhibit none, some, or all of the following advantages. For example, in one embodiment, a system for call forwarding is provided. In a particular embodiment, the system may detect when a mobile station registers with the communication system. A mobile station may register with the system, for example, when a subscriber turns on the mobile station or roams into the communication system with the mobile station. After detecting the mobile station, the system may forward calls for a telephonic device associated with the mobile station to the mobile station. The telephonic device may, for example, be a desk telephone belonging to the mobile station subscriber. By detecting the presence of the mobile station in the communication system and forwarding calls for an associated telephonic device to the mobile station, the system reduces or eliminates the need for the subscriber to manually activate the call forwarding feature. The system may forward telephone calls to the subscriber's mobile station without having to wait for the subscriber to manually activate the feature. The system may also stop forwarding the calls when the mobile station deregisters with the communication system. This also reduces or eliminates the need for the subscriber to manually deactivate the call forwarding feature, which helps to decrease the likelihood that the subscriber will forget to activate or deactivate the call forwarding feature.

Another advantage of at least some embodiments of the invention is that the subscriber may be contacted using a single telephone number and/or extension number. In a particular embodiment, the system helps to ensure that the telephonic device associated with the mobile station is forwarded to the mobile station. This reduces or eliminates the likelihood that the subscriber will forget to activate the call forwarding feature on one of the subscriber's telephones. As a result, calls for the subscriber are routed to the subscriber's mobile station. A person attempting to contact the employee may need to dial only one telephone number to reach the subscriber, and the call will be routed to the subscriber's mobile station. This helps to increase the ease at which the subscriber may be contacted.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which:

FIG. 7 is a flow diagram illustrating an exemplary method for synchronizing call forwarding in a communication system;

FIG. 8 is a flow diagram illustrating an exemplary method for establishing a call forwarding destination for a mobile station;

FIG. 9 is a flow diagram illustrating an exemplary method for establishing a call forwarding destination for a telephone associated with a mobile station;

DETAILED DESCRIPTION OF THE INVENTION

Figure 1:
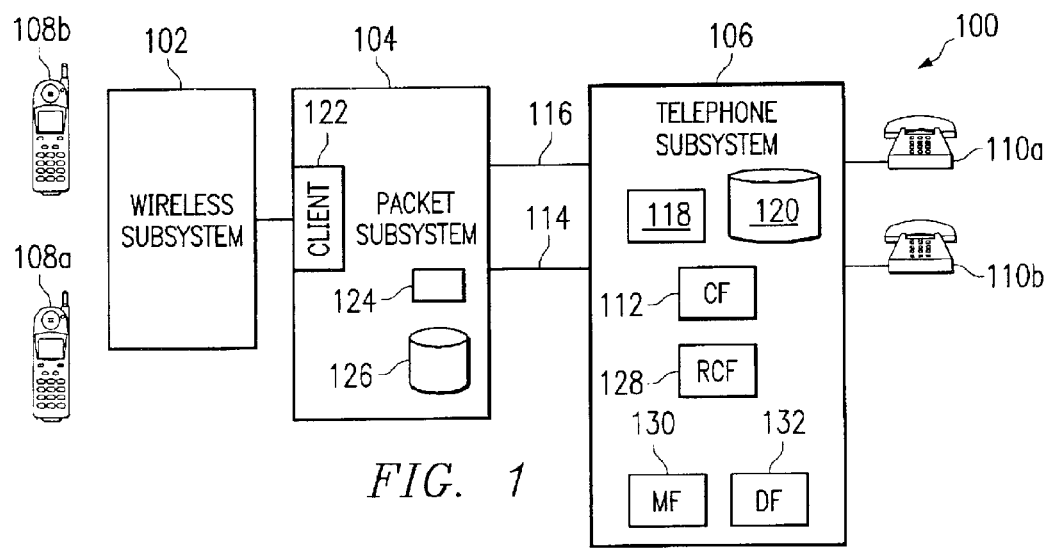
FIG. 1 is a block diagram illustrating an exemplary system for call forwarding.

FIG. 1 is a block diagram illustrating an exemplary system 100 for call forwarding. In the illustrated embodiment, system 100 includes a wireless subsystem 102, a packet subsystem 104, and a telephone subsystem 106. Other embodiments of system 100 may be used without departing from the scope of the present invention.

In one aspect of operation, one or more mobile stations 108 communicate with wireless subsystem 102, and one or more telephones 110 communicate with telephone subsystem 106. A mobile station 108 may be associated with one or more telephones 110, such as when a subscriber using mobile station 108 also has a desk telephone 110 in an office. When mobile station 108 registers with wireless subsystem 102 and/or packet subsystem 104, telephone calls directed at telephone 110 may be forwarded to mobile station 108. For example, a call forwarding feature (CF) 112 in telephone subsystem 106 may be used to forward calls for the associated telephone 110 to mobile station 108. When mobile station 108 deregisters with wireless subsystem 102 and/or packet subsystem 104, system 100 may stop forwarding calls for telephone 110 to mobile station 108. By forwarding telephone calls to mobile station 108 when mobile station 108 registers with system 100 and unforwarding telephone 110 when mobile station 108 deregisters with system 100, system 100 reduces or eliminates the need for a subscriber to manually forward and unforward telephone 110. This also reduces or eliminates the likelihood that the subscriber using mobile station 108 will forget to activate or deactivate the call forwarding feature. In addition, the subscriber using mobile station 108 may be contacted using a single telephone number and/or extension number. Because system 100 automatically forwards telephone calls for telephone 110 to mobile station 108, a person attempting to contact the subscriber need dial only one telephone number, and the subscriber will receive the telephone call on mobile station 108.

Wireless subsystem 102 is coupled to packet subsystem 104. In this document, the term "couple" refers to any direct or indirect communication between two or more elements, whether or not those elements are in physical contact with one another. Wireless subsystem 102 communicates with mobile station 108 over a wireless interface. Wireless subsystem 102 also allows mobile station 108 to communicate with telephone subsystem 106 through packet subsystem 104. Wireless subsystem 102 may, for example, receive information from mobile station 108 and communicate the information to packet subsystem 104. Wireless subsystem 102 may also receive information from packet subsystem 104 and communicate the information to mobile station 108. Wireless subsystem 102 may comprise any hardware, software, firmware, or combination thereof operable to communicate with mobile station 108 over a wireless interface. Wireless subsystem 102 may, for example, comprise a Global System for Mobile communication (GSM) system, an Electronic Industry Alliance/Telecommunication Industry Association (EIA/TIA) IS-136 system, or a Code Division Multiple Access (CDMA) system.

Packet subsystem 104 is coupled to wireless subsystem 102 and telephone subsystem 106. Packet subsystem 104 is operable to transfer information between wireless subsystem 102 and telephone subsystem 106. Packet subsystem 104 may, for example, transport datagrams containing information between wireless subsystem 102 and telephone subsystem 106. Packet subsystem 104 may comprise any hardware, software, firmware, or combination thereof operable to transport datagrams between wireless subsystem 102 and telephone subsystem 106. In one embodiment, packet subsystem 104 supports the International Telecommunications Union-Telecommunications (ITU-T) H.323 protocols to transport datagrams between wireless subsystem 102 and telephone subsystem 106.

Packet subsystem 104 may communicate with telephone subsystem 106 using one or more interfaces. In one embodiment, packet subsystem 104 communicates bearer traffic over an interface 114, and packet subsystem 104 communicates signaling information over interface 114 and/or a Computer Telephony Integration (CTI) interface 116. Interface 114 may comprise any suitable interface operable to transport bearer and/or signaling traffic, such as a trunk interface or a plurality of line interfaces. CTI interface 116 may, for example, comprise an Ethernet or an X.25 packet interface.

Packet subsystem 104 may communicate with wireless subsystem 102 using one or more clients 122. Client 122 may, for example, receive information from mobile station 108 through wireless subsystem 102, place the information into one or more datagrams, and communicate the datagrams across packet subsystem 104. Client 122 may also receive one or more datagrams over packet subsystem 104 from telephone subsystem 106, extract the information contained in the datagrams, and communicate the information to mobile station 108 through wireless subsystem 102. Client 122 may comprise any hardware, software, firmware, or combination thereof operable to facilitate communication between wireless subsystem 102 and packet subsystem 104. In one embodiment, client 122 comprises a wireless adjunct internet platform or other suitable gateway to wireless subsystem 102.

Telephone subsystem 106 is coupled to packet subsystem 104 and to one or more telephones 110. Telephone subsystem 106 facilitates communication with telephones 110. Telephone subsystem 106 may, for example, establish a telephone call between a first telephone 110a and a second telephone 110b. Telephone subsystem 106 may also facilitate communication between a telephone 110 and a mobile station 108 by communicating with packet subsystem 104 over interfaces 114 and/or 116. Telephone subsystem 106 may comprise any suitable hardware, software, firmware, or combination thereof operable to facilitate communication between telephone 110 and mobile station 108. Telephone subsystem 106 may, for example, comprise a private branch exchange (PBX), a Key System, a central office switch, a wireless telephone switch, a packet-based soft switch, or any other suitable circuit-switched and/or packet-switched system.

In the illustrated embodiment, telephone subsystem 106 includes at least one processor 118 operable to execute instructions stored in a memory 120, and packet subsystem 104 includes at least one processor 124 operable to execute instructions stored in a memory 126. In a particular embodiment, processor 118 may be operable to execute a CTI server software program to support CTI interface 116, and processor 124 may be operable to execute a corresponding CTI client software package to support CTI interface 116. The CTI software may, for example, implement the European Computer Manufacturers Association (ECMA) standards ECMA-179 and ECMA-180 for Computer Supported Telecommunications Applications (CSTA). In a particular embodiment, processors 118 and 124 execute the CT CONNECT software package. Processors 118 and 124 may use the CTI interface, for example, to activate and deactivate call forwarding feature 112 or otherwise control telephone subsystem 106.

Mobile station 108 communicates with wireless subsystem 102 over a wireless interface. Mobile station 108 may comprise any suitable wireless device operable to communicate with and roam within wireless subsystem 102. Mobile station 108 may, for example, comprise a mobile telephone or a computer coupled to a wireless modem or radio unit. In one embodiment, mobile station 108 may register with wireless subsystem 102 using the method described in U.S. application Ser. No. 09/782,100, entitled "Method and System for Selecting a Preferred Cell in a Wireless Communication System." Mobile station 108 may also comprise a dual mode mobile station operable to communicate with wireless subsystem 102 using a first protocol and with a public network using a second protocol. In a particular embodiment, mobile station 108 comprises a dual mode GSM/IS-136 mobile handset. Other embodiments of mobile station 108 may be used without departing from the scope of the present invention.

Telephone 110 is coupled to telephone subsystem 106. Telephone 110 may comprise any suitable wireline or wireless telephonic device operable to communicate with telephone subsystem 106. In this document, the phrase "telephonic device" refers to any hardware, software, firmware, or combination thereof operable to provide voice phone services. Telephone 110 may, for example, comprise a fixed telephone, a wireless mobile station, a voice over packet telephone, or a computer executing a telephonic application.

In one aspect of operation, mobile station 108 may be associated with one or more telephones 110. In one embodiment, mobile station 108 is associated with one telephone 110. Mobile station 108 may register with system 100, such as when mobile station 108 is turned on or roams into wireless subsystem 102. When mobile station 108 registers with system 100, packet subsystem 104 signals telephone subsystem 106 to forward calls for the associated telephone 110 to mobile station 108. While mobile station 108 is registered in system 100, each call for the subscriber is directed to mobile station 108. For example, if a call is made to the subscriber's telephone 110, the call is forwarded to the subscriber's mobile station 108 through the packet subsystem 104 and the wireless subsystem 102. If another mobile station 108 calls the subscriber's mobile station 108 or the subscriber's telephone 110, the call is routed through wireless subsystem 102 without being routed through telephone subsystem 106.

Mobile station 108 may also deregister with system 100, such as when mobile station 108 is turned off or roams out of wireless subsystem 102. When mobile station 108 deregisters with system 100, packet subsystem 104 signals telephone subsystem 106 to stop forwarding calls for the associated telephone 110 to mobile station 108. In a particular embodiment, packet subsystem 104 also forwards calls for the deregistered mobile station 108 to the telephone 110 associated with mobile station 108. In this embodiment, while mobile station 108 is deregistered with system 100, each call for the subscriber is directed to telephone 110. If a call is made to the subscriber's mobile station 108, the call is routed to telephone 110 through packet subsystem 104 and telephone subsystem 106.

System 100 may use any suitable method to forward calls for a telephone 110 to a mobile station 108. In one embodiment, as mobile station 108 registers and deregisters with system 100, processor 124 may instruct processor 118 over CTI interface 116 or interface 114 to activate or deactivate the call forwarding feature 112. When mobile station 108 is registered, processor 118 may forward calls for telephone 110 to packet subsystem 104, which communicates the calls to mobile station 108 through wireless subsystem 102.

In another embodiment, processor 124 may use a remote call forwarding feature 128 in telephone subsystem 106 to forward calls for telephone 110 to mobile station 108. Remote call forwarding feature 128 may, for example, allow one telephone 110 to activate or deactivate the call forwarding feature 112 for another telephone 110. Using remote call forwarding feature 128, processor 124 may instruct processor 118 to forward calls for telephone 110 to packet subsystem 104, which communicates the call to mobile station 108.

In yet another embodiment, processor 124 may instruct processor 118 to monitor a telephone 110 using a monitoring feature (MF) 130. When processor 118 detects an incoming call for a telephone 110 using monitoring feature 130, processor 118 informs processor 124 of the call. If the mobile station 108 associated with the telephone 110 is registered in system 100, processor 124 instructs processor 118 to deflect the call to packet subsystem 104 through interface 114 using a deflection feature (DF) 132. Packet subsystem 104 receives the call over interface 114 and communicates the call to mobile station 108.

Although FIG. 1 illustrates one embodiment of system 100, various changes may be made to system 100 without departing from the scope of the present invention. For example, packet subsystem 104 may communicate with telephone subsystem 106 over interface 114, without the use of a CTI interface 116. Also, any suitable number and/or types of telephones 110 may be used with telephone subsystem 106, and any suitable number of mobile stations 108 may communicate with wireless subsystem 102. Further, although FIG. 1 illustrates wireless subsystem 102, packet subsystem 104, and telephone subsystem 106 as distinct entities, one or more of the subsystems may be combined without departing from the scope of the present invention. For example, packet subsystem 104 may be contained within wireless subsystem 102. In addition, functions described as residing within one element of system 100 may be implemented in other elements of system 100. Beyond that, the invention may be implemented in system 100 using any logic stored in at least one computer processable medium. The logic may be encoded in hardware, software instructions, and/or firmware instructions stored in any suitable device such as, for example, a random access memory (RAM), a read-only memory (ROM), an application-specific integrated circuit (ASIC), or a field programmable gate array (FPGA). Other changes may be made without departing from the scope of the present invention.

Figure 2:
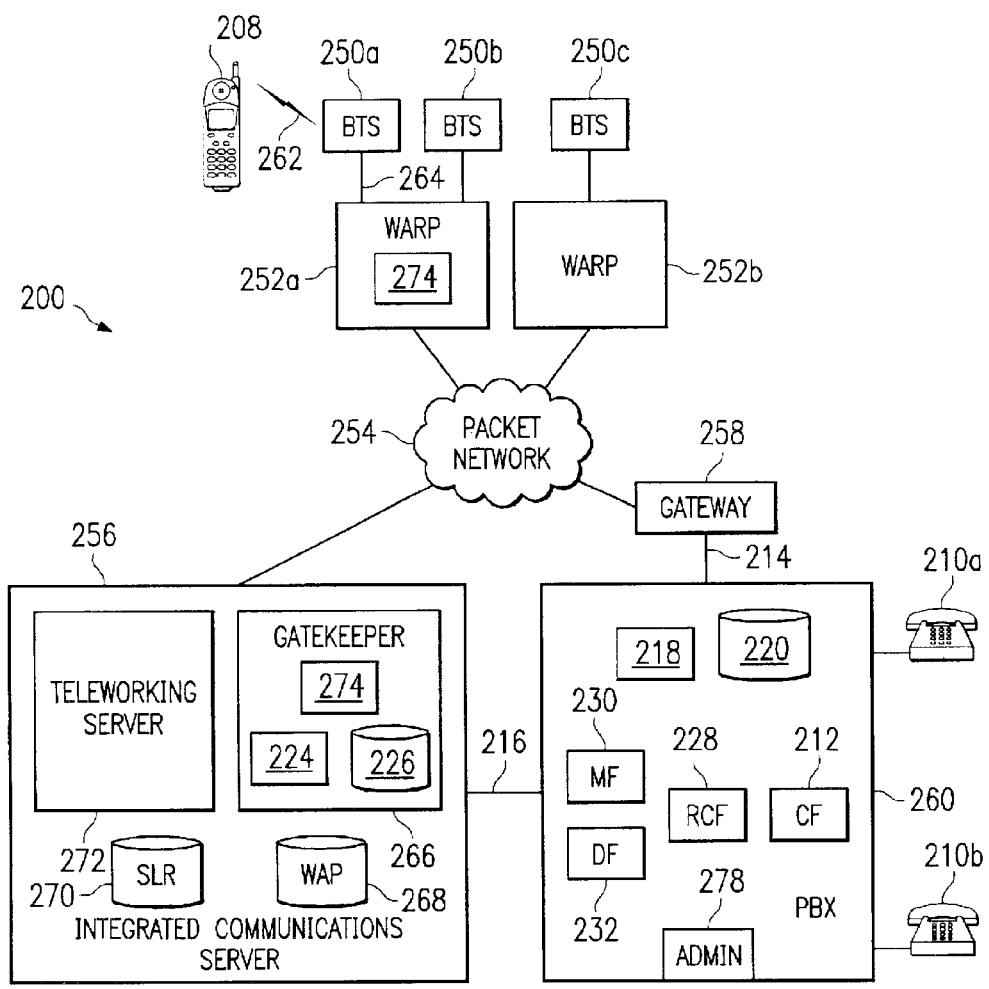
FIG. 2 is a block diagram illustrating another exemplary system for call forwarding.

FIG. 2 is a block diagram illustrating another exemplary system 200 for call forwarding. In the illustrated embodiment, system 200 includes one or more base stations (BTS) 250, one or more Wireless Adjunct Internet Platforms (WARP) 252, a packet network 254, an integrated communications server 256, a gateway 258, and a PBX 260. Other embodiments of system 200 may be used without departing from the scope of the present invention.

Base station 250 is coupled to WARP 252. Base station 250 provides bi-directional communication with mobile stations 208 in a specified geographic area over a wireless interface 262. Base station 250 also transfers information between mobile station 208 and WARP 252. Base station 250 may comprise any hardware, software, firmware, or combination thereof operable to communicate with mobile stations 208 over a wireless interface. Base station 250 may, for example, comprise one or more transceivers operable to exchange circuit-switched and/or packet-switched information with mobile station 208.

Wireless interface 262 facilitates communication between mobile station 208 and base station 250. Wireless interface 262 may comprise any wireless interface operable to transfer circuit-switched and/or packet-switched information between mobile station 208 and base station 250. Interface 262 may, for example, comprise a GSM General Packet Radio Service (GSM/GPRS) interface or a GSM Enhanced Data rates for GSM Evolution (GSM/EDGE) interface.

WARP 252 is coupled to base station 250 by an interface 264 and to packet network 254. WARP 252 facilitates communication between mobile stations 208 and PBX 260 by transporting voice and/or data information between base station 250 and packet network 254. In one embodiment, WARP 252 communicates with mobile station 208 through base station 250 using a circuit-switched protocol, and WARP 252 communicates with packet network 254 using a packet-switched protocol. In this embodiment, WARP 252 also performs an interworking function to translate between the circuit-switched and packet-switched protocols. For example, WARP 252 may convert between the GSM 04.08 and 08.60 protocols used by mobile station 208 and the ITU-T H.323 protocols used by integrated communications server 256 and gateway 258. In addition, WARP 252 packetizes information from mobile station 208 into datagrams for transmission over packet network 254, and WARP 252 depacketizes information contained in datagrams received over packet network 254. WARP 252 may comprise any hardware, software, firmware, or combination thereof operable to facilitate communication between base station 250 and packet network 254.

Interface 264 is coupled to base station 250 and WARP 252. Interface 264 may comprise any suitable interface operable to transfer circuit-switched and/or packet-switched information between base station 250 and WARP 252. Interface 264 may, for example, comprise a GSM Abis wireline interface.

Packet network 254 is coupled to WARP 252, integrated communications server 256, and gateway 258. Packet network 254 transports datagrams from one network address in packet network 254 to another network address. In addition, packet network 254 may be coupled to and communicate with external data or voice networks, such as the Internet or a public land mobile network. Packet network 254 may comprise any suitable packet-switched network. Packet network 254 may, for example, comprise a Local Area Network (LAN), a Wide Area Network (WAN), a Metropolitan Area Network (MAN), a portion of a global computer network such as the Internet, or any other communications system or systems at one or more locations.

In the illustrated embodiment, integrated communications server 256 includes a gatekeeper 266, a Wireless Application Protocol (WAP) server 268, a subscriber location register (SLR) 270, and a teleworking server 272. Although FIG. 2 illustrates integrated communications server 256 as comprising all four of these components, any or all of these components may be implemented on a separate platform or platforms without departing from the scope of the present invention.

Gatekeeper 266 provides call control services for mobile stations 208, WARPs 252, and gateway 258. For example, gatekeeper 266 tracks the location of mobile stations 208, and gatekeeper 266 routes calls for a mobile station 208 to and from the WARP 252 currently serving that mobile station 208. This allows subscribers using mobile stations 208 to roam between geographic areas covered by different base stations 250. Gatekeeper 266 also performs address translation to convert the phone number associated with mobile station 208 to a network address of WARP 252 serving that mobile station 208. In addition, gatekeeper 266 performs call forwarding functions in system 200. Gatekeeper 266 may, for example, instruct PBX 260 to forward calls for a telephone 210 to a mobile station 208. Gatekeeper 266 may communicate signaling information to PBX 260 over CTI interface 216 or through gateway 258. Gatekeeper 266 may comprise any hardware, software, firmware, or combination thereof operable to provide call control services in system 200.

WAP server 268 stores subscriber information used to allow mobile stations 208 to execute data-based applications and receive data-based services. WAP server 268 may, for example, allow mobile stations 208 to send and receive e-mail, access an enterprise's intranet such as packet network 254, or access the Internet. WAP server 268 may comprise any suitable hardware, software, firmware, or combination thereof operable to provide WAP functionality to mobile stations 208.

Subscriber location register 270 stores subscriber management information for mobile stations 208. For example, subscriber location register 270 may store general subscriber management information downloaded from a public network when mobile station 208 roams into system 200. Subscriber location register 270 also stores each subscriber's extension number, direct dial number, and any other information that is specific to system 200. Subscriber location register 270 may comprise any hardware, software, firmware, or combination thereof operable to store subscriber management information. Subscriber location register 270 may, for example, comprise a SUN workstation with a database.

Teleworking server 272 supports teleworking services in system 200. Teleworking server 272 may, for example, allow a user of system 200 to access information and/or communication capabilities of system 200 from remote locations. The user of telephone 210 may access teleworking server 272 and inform teleworking server 272 of the user's current location. Teleworking server 272 may allow the user to use a remote telephone and to receive the same features as if the user was using telephone 210, even if the remote telephone is outside of system 200. Teleworking server 272 may comprise any hardware, software, firmware, or combination thereof operable to provide teleworking services in system 200.

Gateway 258 is coupled to packet network 254 and PBX 260. Gateway 258 may also be coupled to a public network, such as a public switched telephone network. Gateway 258 transfers information between packet network 254 and PBX 260. In one embodiment, gateway 258 communicates with packet network 254 using a packet-switched protocol and with PBX 260 using a circuit-switched protocol. In this embodiment, gateway 258 also performs an interworking function to translate between the packet-switched and circuit-switched protocols. In a particular embodiment, gateway 258 converts between the ITU-T H.323 protocols used by WARP 252 and integrated communications server 256 and the circuit-switched protocols used by PBX 260. In addition, gateway 258 packetizes information into datagrams for transmission over packet network 254, and gateway 258 depacketizes information contained in datagrams received over packet network 254. Gateway 258 may communicate bearer and signaling information to PBX 260 over interface 214. Gateway 258 may comprise any hardware, software, firmware, or combination thereof operable to facilitate communication between packet network 254 and PBX 260.

PBX 260 is coupled to gateway 258 and to one or more telephones 210. PBX 260 may also be coupled to one or more public networks, such as a public land mobile network and a public switched telephone network. PBX 260 transfers information between telephones 210 and/or between gateway 258 and telephones 210. PBX 260 may comprise any suitable circuit-switched and/or packet-switched network operable to facilitate communication between telephone 210 and gateway 258.

In one aspect of operation, mobile station 208 may register with WARP 252, and WARP 252 informs gatekeeper 266 that mobile station 208 has registered in system 200. Registration may occur, for example, when a subscriber turns on mobile station 208 or roams into a geographic area monitored by base station 250. After registration, system 200 forwards calls for a telephone 210 associated with mobile station 208 to that mobile station 208. System 200 may also stop forwarding calls to mobile station 208 when mobile station 208 deregisters with system 200. Deregistration may occur, for example, when a subscriber turns off mobile station 208 or roams out of the geographic area monitored by base stations 250 in system 200. After deregistration, system 200 may route calls for the deregistered mobile station 208 to the telephone 210 associated with mobile station 208.

System 200 may use any suitable method for forwarding calls directed at a telephone 210 to a mobile station 208. In one embodiment, PBX 260 includes a call forwarding feature 212, such as a Call Forward Unconditional feature. This feature 212 may, for example, be supported by CTI software stored in memory 220 and executed by processor 218 in PBX 260. In a particular embodiment, WARP 252 and/or gatekeeper 266 instructs PBX 260 to invoke feature 212 and forward calls for telephone 210 to gateway 258. For example, processor 224 in gatekeeper 266 may execute CTI software stored in memory 226, and processor 224 may instruct processor 218 in PBX 260 to activate or deactivate call forwarding feature 212. Gateway 258 receives and forwards the calls to mobile station 208 over packet network 254, WARP 252, and base station 250. WARP 252 or gatekeeper 266 may instruct PBX 260 to invoke call forwarding feature 212 and forward calls to gateway 258 using the CTI interface 216 or through an administration port (ADMIN) 278.

In another embodiment, WARP 252 and/or gatekeeper 266 may include a telephone emulator card 274. Card 274 appears to PBX 260 as a telephone 210. In this embodiment, PBX 260 may support a Remote Call Forwarding feature (RCF) 228, which allows call forwarding feature 212 to be activated and deactivated from another telephone 210. Using the telephone emulator card 274, WARP 252 or gatekeeper 266 instructs PBX 260 to activate or deactivate call forwarding feature 212 using the remote call forwarding feature 228.

In yet another embodiment, PBX 260 may support a call monitoring feature 230 and a call deflection feature 232. These features may, for example, be supported by CTI software stored in memory 220 and executed by processor 218. Processor 218 in PBX 260 may monitor a telephone 210 using monitoring feature 230 and wait for an alert event, which indicates that an incoming call for telephone 210 exists. When processor 218 detects an alert event for a monitored telephone 210, processor 224 determines if the mobile station 208 associated with telephone 210 is registered in system 200. If the mobile station 208 is registered, processor 224 instructs processor 218 in PBX 260 to deflect the incoming call to gateway 258 over interface 214 using deflection feature 232.

In still another embodiment, when mobile station 208 registers in system 200, WARP 252 or gatekeeper 266 may instruct teleworking server 272 to treat mobile station 208 as a remote location for telephone 210. Teleworking server 272 then instructs PBX 260 to forward calls for telephone 210 to mobile station 208 using remote call forwarding feature 228.

Although FIG. 2 illustrates one embodiment of system 200, various changes may be made to system 200 without departing from the scope of the present invention. For example, any number of base stations 250 may be coupled to each WARP 252, and any number of WARPs 252 may be coupled to packet network 254. Also, although FIG. 2 illustrates a PBX 260 coupled to gateway 258, other telephone systems may be coupled to gateway 258, such as a Key System, a central office switch, a wireless telephone switch, a packet-based soft switch, or any other suitable circuit-switched and/or packet-switched system. Further, although gatekeeper 266 and gateway 258 are illustrated as separate entities, both may be implemented in an integrated platform. In addition, functions described as residing within one element of system 200 may be implemented in other elements of system 200. Beyond that, the invention may be implemented in system 200 using any logic stored in at least one computer processable medium. Other changes may be made to system 200 without departing from the scope of the present invention.

Figure 3:
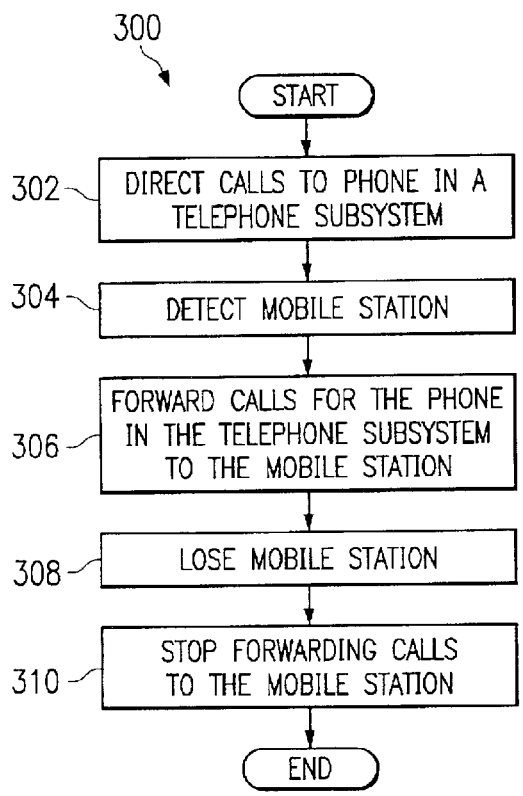
FIG. 3 is a flow diagram illustrating an exemplary method for call forwarding in a communication system.

FIG. 3 is a flow diagram illustrating an exemplary method 300 for call forwarding in a communication system. System 100 directs calls to a telephone 110 in a telephone subsystem 106 at step 302. This may include, for example, telephone subsystem 106 receiving a call from a public network, another telephone 110 in telephone subsystem 106, or a mobile station 108. System 100 detects a mobile station 108 associated with a telephone 110 at step 304. This may include, for example, mobile station 108 registering with wireless subsystem 102 and/or packet subsystem 104, such as by communicating a registration signal to wireless subsystem 102. System 100 forwards calls for the telephone 110 in the telephone subsystem 106 to the mobile station 108 at step 306. This may include, for example, wireless subsystem 102 and/or packet subsystem 104 instructing telephone subsystem 106 to forward calls for telephone 110 to mobile station 108. System 100 loses contact with mobile station 108 at step 308. This may include, for example, mobile station 108 deregistering from system 100, such as when a subscriber turns off mobile station 108 or roams outside the geographic area covered by wireless subsystem 102. System 100 stops forwarding calls for telephone 110 to mobile station 108 at step 310. This may include, for example, wireless subsystem 102 and/or packet subsystem 104 clearing the call forwarding feature in telephone subsystem 106.

Although FIG. 3 has been described with respect to system 100, method 300 may be used with any suitable communication system. Method 300 may be used, for example, in a system having a packet subsystem 104 and a telephone subsystem 106, without a wireless subsystem 102. In this embodiment, method 300 may forward calls directed at telephone 110 to a packet-based client coupled to packet subsystem 104.

Figure 4:
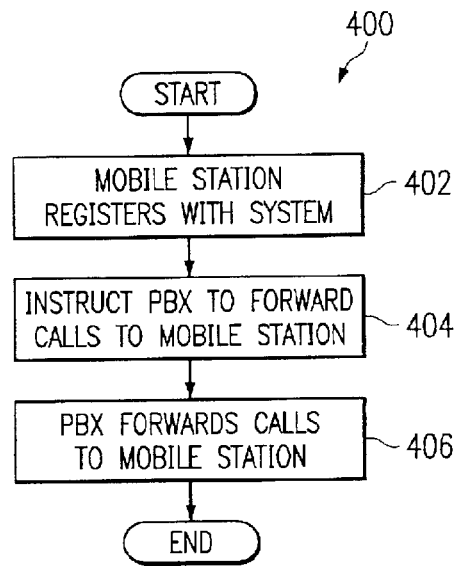
FIG. 4 is a flow diagram illustrating an exemplary method for forwarding calls for a telephone to a mobile station.

FIG. 4 is a flow diagram illustrating an exemplary method 400 for forwarding calls for a telephone to a mobile station. A mobile station 208 registers with system 200 at step 402. This may include, for example, a subscriber turning on mobile station 208 or roaming into the geographic area covered by system 200. This may also include mobile station 208 communicating a registration signal to base station 250, which communicates the signal to WARP 252. WARP 252 may then inform gatekeeper 266 of the registration. System 200 instructs PBX 260 to forward telephone calls for a telephone 210 associated with mobile station 208 to mobile station 208 at step 404. This may include, for example, gatekeeper 266 or WARP 252 invoking one or more features 212, 228, 230, 232 of PBX 260 using at least one of CTI interface 216, trunk or line interface 214, administration port 278, teleworking server 272, and telephone emulator card 274. PBX 260 forwards calls for telephone 210 to mobile station 208 at step 406. This may include, for example, PBX 260 receiving a telephone call for a telephone 210 and forwarding the call to gateway 258.

Figure 5:
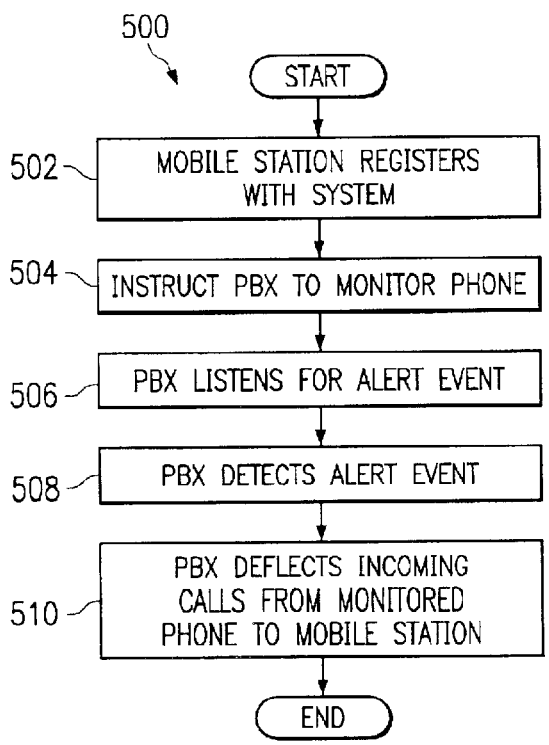
FIG. 5 is a flow diagram illustrating another exemplary method for forwarding calls for a telephone to a mobile station.

FIG. 5 is a flow diagram illustrating another exemplary method 500 for forwarding calls for a telephone 210 to a mobile station 208. A mobile station 208 registers with system 200 at step 502. This may include, for example, a subscriber turning on mobile station 208 or roaming into range of a base station 250 in system 200. This may also include mobile station 208 communicating a registration message to base station 250, base station 250 forwarding the information to WARP 252, and WARP 252 informing gatekeeper 266 of the registration. System 200 instructs PBX 260 to monitor a telephone 210 at step 504. This may include, for example, a processor 224 in WARP 252 or gatekeeper 266 instructing a processor 218 in PBX 260 to monitor a particular telephone 210 using monitoring feature 230. PBX 260 listens for an alert event at step 506. An alert event is generated when an incoming call for a telephone 210 has been received by PBX 260. PBX 260 detects an alert at step 508. This indicates that someone has placed an incoming call to telephone 210, and an alert signal has been communicated to telephone 210 to cause telephone 210 to ring. PBX 260 deflects the incoming call from the monitored telephone 210 to mobile station 208 at step 510. This may include, for example, processor 218 in PBX 260 redirecting the incoming call using deflection feature 232 to gateway 258, which forwards the incoming call to mobile station 208.

Figure 6:
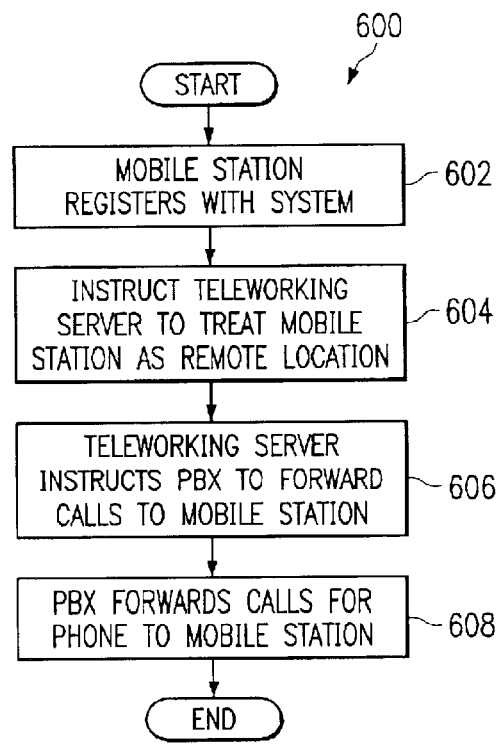
FIG. 6 is a flow diagram illustrating yet another exemplary method for forwarding calls for a telephone to a mobile station.

FIG. 6 is a flow diagram illustrating yet another exemplary method 600 for forwarding calls for a telephone 210 to a mobile station 208. Mobile station 208 registers with system 200 at step 602. This may include, for example, a subscriber turning on mobile station 208 or roaming into system 200. Teleworking server 272 is instructed to treat mobile station 208 as a remote location for a telephone 210 at step 604. This may include, for example, mobile station 208, WARP 252, and/or gatekeeper 266 communicating the instructions to teleworking server 272. Teleworking server 272 instructs PBX 260 to forward calls for telephone 210 to mobile station 208 at step 606. This may include, for example, teleworking server 272 instructing PBX 260 to forward the calls to gateway 258 using remote call forwarding feature 228 and call forwarding feature 212. PBX 260 forwards calls for telephone 210 to mobile station 208 at step 608. This may include, for example, PBX 260 forwarding the calls for telephone 210 to gateway 258, which forwards the calls to mobile station 208.

FIG. 7 is a flow diagram illustrating an exemplary method 700 for synchronizing call forwarding in a communication system. A mobile station 208 registers with system 200 at step 702. This may include, for example, mobile station 208 being turned on or roaming into system 200. System 200 synchronizes the call forwarding destinations in the different components of system 200 at step 704. If neither mobile station 208 nor telephone 210 is forwarded to a specific destination, this may include system 200 forwarding telephone 210 to mobile station 208. If one of mobile station 208 or telephone 210 is forwarded to a specific destination, this may include ensuring that both mobile station 208 and telephone 210 are forwarded to the same destination. If mobile station 208 and telephone 210 are forwarded to different destinations, this may include forwarding one of the devices 208, 210 to the destination of the other 210, 208.

A change to the call forwarding feature in either telephone 210 or mobile station 208 is made at step 706. This may include, for example, a subscriber forwarding mobile station 208 or telephone 210 to a new destination. System 200 maintains call forwarding synchronization at step 708. This may include, for example, ensuring either that mobile station 208 and telephone 210 are forwarded to the same destination, telephone 210 is forwarded to mobile station 208, or mobile station 208 is forwarded to telephone 210. Mobile station 208 deregisters with system 200 at step 710. This may include, for example, a subscriber turning off mobile station 208 or roaming outside of system 200. System 200 restores the call forwarding in system 200 at step 712. This may include, for example, system 200 determining if telephone 210 is forwarded to mobile station 208 or to another destination. If telephone 210 is forwarded to mobile station 208, system 200 turns the call forwarding feature off for telephone 210. Otherwise, system 200 does not change the call forwarding destination for telephone 210.

Although FIG. 7 has been described with respect to system 200, method 700 may be used with any suitable communication system. Method 700 may be used, for example, in a system having a packet subsystem 104 and a telephone subsystem 106, without a wireless subsystem 102. In this embodiment, method 700 may synchronize call forwarding for a telephone 110 and a packet-based client coupled to packet subsystem 104. Method 700 could also be used in a system having a wireless subsystem 102 and a telephone subsystem 106, without a packet subsystem 104.

FIG. 8 is a flow diagram illustrating an exemplary method 800 for establishing a call forwarding destination for a mobile station 208. Telephone 210 is forwarded to a specific destination, called "location X," at step 802. This may include, for example, a user of telephone 210 manually forwarding telephone 210 to the specific destination. Mobile station 208 registers with system 200 at step 804. System 200 forwards calls for mobile station 208 to the specific destination at step 806. This may include, for example, gatekeeper 266 and/or WARP 252 receiving the specific destination from PBX 260. This may also include WARP 252 and/or gatekeeper 266 routing datagrams destined for mobile station 208 to the forwarded location. This helps to synchronize call forwarding in system 200 by ensuring that calls for the subscriber are routed to the same location, whether the incoming calls are directed at mobile station 208 or telephone 210.

The subscriber turns off the call forwarding feature for mobile station 208 at step 808. This may include the subscriber manually entering a code on mobile station 208 to deactivate the call forwarding. This may also include WARP 252 and/or gatekeeper 266 receiving the instruction to deactivate call forwarding for the mobile station 208. System 200 sets the call forwarding for the telephone 210 to the mobile station 208 at step 810. This may include, for example, WARP 252 and/or gatekeeper 266 instructing PBX 260 to forward calls for telephone 210 to mobile station 208. This also helps to synchronize call forwarding in system 200 by ensuring that calls for the subscriber are routed to the mobile station 208.

FIG. 9 is a flow diagram illustrating an exemplary method 900 for establishing a call forwarding destination for a telephone 210 associated with a mobile station 208. Method 900 begins at step 902, where the call forwarding feature of a mobile station 208 is turned off, or not set to a specified location. Mobile station 208 registers with system 200 at step 904, and system 200 forwards calls for the associated telephone 210 to the mobile station 208 at step 906. This helps to ensure call forward synchronization in system 200 by directing calls for the subscriber to the subscriber's mobile station 208.

The subscriber activates the call forwarding feature and forwards calls for mobile station 208 to a specific destination, labeled "location Y," at step 908. This may include, for example, the subscriber manually entering a code on mobile station 208 to forward mobile station 208 to the specific destination. This may also include WARP 252 and/or gatekeeper 266 receiving the new destination for mobile station 208. System 200 forwards calls for the associated telephone 210 to the same destination at step 910. This may include, for example, WARP 252 and/or gatekeeper 266 instructing PBX 260 to forward calls for telephone 210 to the new destination. This helps to synchronize call forwarding in system 200 by ensuring that calls for the subscriber are forwarded to the same destination, whether the calls are directed at the subscriber's mobile station 208 or telephone 210.

Figures 10, 11:
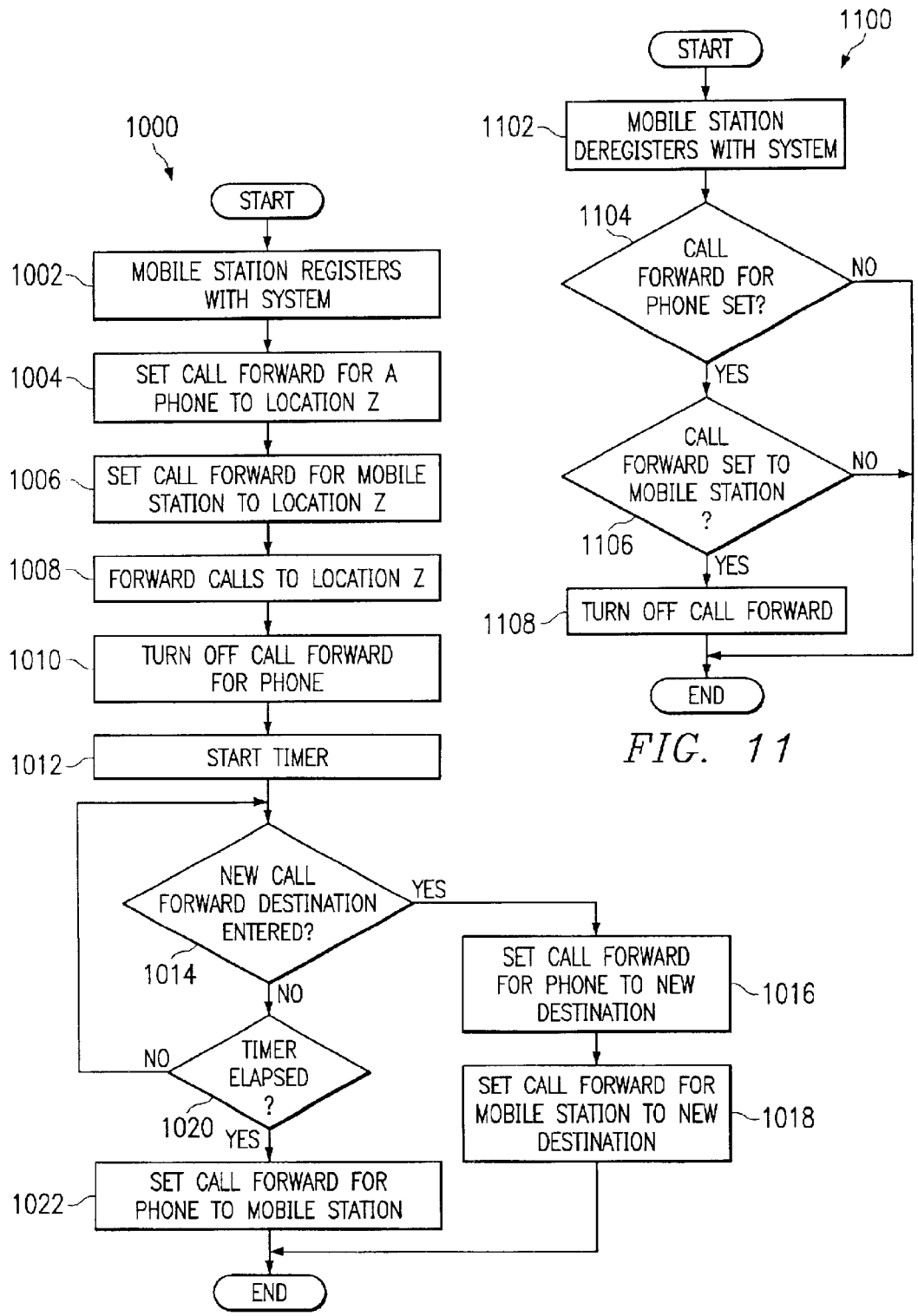
FIG. 10 is a flow diagram illustrating another exemplary method for establishing a call forwarding destination for a telephone associated with a mobile station.
FIG. 11 is a flow diagram illustrating an exemplary method for establishing a call forwarding destination for a telephone associated with a deregistered mobile station.

FIG. 10 is a flow diagram illustrating another exemplary method 1000 for establishing a call forwarding destination for a telephone 210 associated with a mobile station 208. Mobile station 208 registers with system 200 at step 1002. A subscriber forwards calls for a telephone 210 associated with mobile station 208 to a specific destination, called "location Z," at step 1004. System 200 also activates the call forwarding feature for mobile station 208 and forwards calls for mobile station 208 to the same specific destination at step 1006. Calls for the subscriber are forwarded to the destination at step 1008, whether the calls are directed at the mobile station 208 or the telephone 210.

Call forwarding is deactivated for the telephone 210 at step 1010, such as by manually deactivating the call forwarding feature. System 200 starts a timer at step 1012. Gatekeeper 266 and/or WARP 252 may set the timer to any suitable duration, such as fifteen seconds. System 200 determines if another call forwarding destination for telephone 210 is entered at step 1014. This may include, for example, WARP 252 and/or gatekeeper 266 determining if another destination has been entered. If another destination is entered before the timer elapses, system 200 sets the call forwarding destination for the telephone 210 to the new destination at step 1016. To maintain synchronization, system 200 also forwards mobile station 208 to the new destination at step 1018.

If system 200 does not detect a new destination at step 1014, system 200 checks whether the timer has elapsed at step 1020. If the timer has not elapsed, system 200 returns to step 1014 to await a new call forwarding destination.

When the timer elapses, system 200 sets the call forwarding destination for telephone 210 to mobile station 208. System 200 maintains call forwarding synchronization by ensuring that calls for the subscriber are routed to the mobile station 208.

FIG. 11 is a flow diagram illustrating an exemplary method 1100 for establishing a call forwarding destination for a telephone 210 associated with a deregistered mobile station 208. A mobile station 208 deregisters with system 200 at step 1102. This may include, for example, a subscriber turning off mobile station 208 or roaming outside of system 200. System 200 determines if telephone 210 is forwarded at step 1104. This may include, for example, WARP 252 and/or gatekeeper 266 determining if the call forwarding feature 212 for telephone 210 has been activated. If telephone 210 is not forwarded, method 1100 ends. Call forwarding in system 200 is synchronized because telephone 210 is not forwarded to a deregistered mobile station 208.

If call forwarding for telephone 210 is active, system 200 determines if telephone 210 is forwarded to the mobile station 208 at step 1106. This may include, for example, WARP 252 and/or gatekeeper 266 determining if telephone 210 has been forwarded to gateway 258. If not, method 1100 ends. Call forwarding in system 200 is synchronized because telephone 210 is not forwarded to a deregistered mobile station 208. If telephone 210 is forwarded to the mobile station 208 at step 1106, system 200 deactivates the call forwarding for telephone 210 at step 1108. Because telephone 210 is forwarded to a deregistered mobile station 208, system 200 deactivates call forwarding for telephone 210 to maintain synchronization in system 200.

Figure 12:
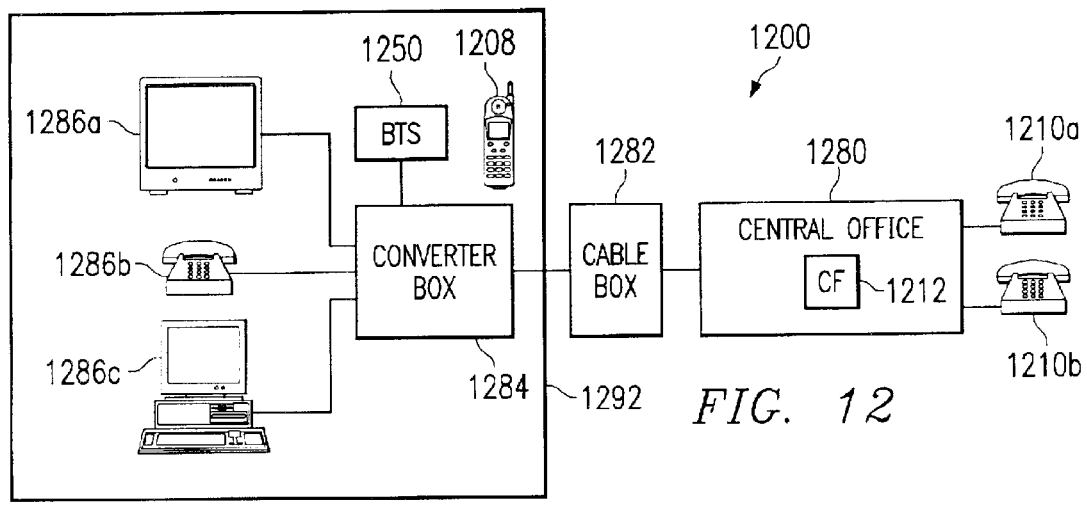
FIG. 12 is a block diagram illustrating yet another exemplary system for call forwarding.

FIG. 12 is a block diagram illustrating yet another exemplary system 1200 for call forwarding. In the illustrated embodiment, system 1200 includes a base station 1250, a central office 1280, a cable box 1282, and a converter box 1284. Other embodiments of system 1200 may be used without departing from the scope of the present invention.

Central office 1280 is coupled to telephones 1210 and cable box 1282. Central office 1280 facilitates communication in system 1200, such as between two telephones 1210 or between a telephone 1210 and cable box 1282. Central office 1280 may comprise any suitable circuit-switched and/or packet-switched system, such as one or more Class 5 switches.

Cable box 1282 is coupled to central office 1280 and converter box 1284. Cable box 1282 facilitates communication between central office 1280 and converter box 1284. In one embodiment, cable box 1282 communicates with central office 1280 using a first protocol and with converter box 1284 using a second protocol. For example, cable box 1282 may communicate with converter box 1284 using a packet over cable protocol, and cable box 1282 may communicate with central office 1280 using a Bellcore GR-303 interface, a V5.2 interface, or a V5.3 interface. In this embodiment, cable box 1282 may convert and packetize information from central office 1280 for communication to converter box 1284. Cable box 1282 may also convert and depacketize information from converter box 1284 for communication to central office 1280. Cable box 1282 may comprise any hardware, software, firmware, or combination thereof operable to facilitate communication of voice information between central office 1280 and converter box 1284.

Converter box 1284 is coupled to cable box 1282, one or more devices 1286, and base station 1250. Converter box 1284 is operable to receive information from cable box 1282 and to communicate the information to one or more devices 1286 or base station 1250. In one embodiment, converter box 1284 may receive audio and video information, voice information, and/or data from cable box 1282. Converter box 1284 may communicate the audio and video information to a television 1286a, the voice information to a telephone 1286b or base station 1250, and the data to a computing device 1286c. Converter box 1284 may also receive information from devices 1286 and/or base station 1250, such as voice information from device 1286b and/or base station 1250. Converter box 1284 is operable to communicate the information to central office 1280 through cable box 1282.

In one aspect of operation, when mobile station 1208 comes within range of base station 1250, a signal may be sent through converter box 1284 and cable box 1282 to central office 1280. A call forwarding feature 1212 or other feature in central office 1280 may cause calls directed at a telephone 1210 to be forwarded to mobile station 1208. Also, because calls for telephone 1286b may be routed through central office 1280, call forwarding feature 1212 or another feature of central office 1280 may be used to forward calls for telephone 1286b to mobile station 1208. When mobile station 1208 roams outside of the range of base station 1250, a signal may be sent to central office 1280 instructing central office 1280 to stop forwarding calls to mobile station 1208.

In a particular embodiment, devices 1286 may be located in a residence 1292, such as a house or apartment. As an example, television 1286a may receive cable television services, phone 1286b may receive voice over cable services, and computing device 1286c may receive cable modem services through converter box 1284. To provide wireless services in residence 1292, a base station 1250, such as an antenna with a range of 300 feet, may be installed in residence 1292. When mobile station 1208 roams within the range of base station 1250, central office 1280 may be instructed to forward calls for a telephone 1210 to mobile station 1208. Telephone 1210 could, for example, represent a desk phone at the office of the subscriber using mobile station 1208, and calls directed to the subscriber's office would be forwarded to mobile station 1208. Also, because calls for telephone 1286b may be routed through central office 1280, central office 1280 may forward calls for telephone 1286b to mobile station 1208. This may allow, for example, all calls for the subscriber to be forwarded to mobile station 1208, whether the calls are directed at telephone 1210, telephone 1286b in residence 1292, or mobile station 1208.

Although FIG. 12 illustrates one embodiment of system 1200, various changes may be made to system 1200 without departing from the scope of the present invention. For example, system 1200 may include some or none of devices 1286. Also, in another embodiment, converter box 1284 may not possess the ability to directly communicate information to and receive information from base station 1250, and a WARP may be coupled between base station 1250 and converter box 1284 to facilitate communication.

Figure 13:
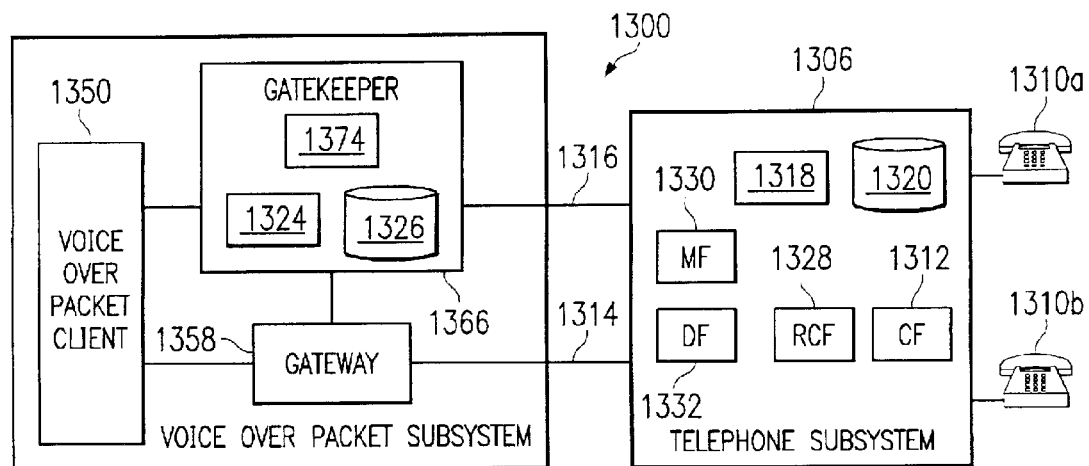
FIG. 13 is a block diagram illustrating still another exemplary system for call forwarding.

FIG. 13 is a block diagram illustrating still another exemplary system 1300 for call forwarding. In the illustrated embodiment, system 1300 includes a voice over packet subsystem 1304 and a telephone subsystem 1306. Other embodiments of system 1300 may be used without departing from the scope of the present invention.

In the illustrated embodiment, telephone subsystem 1306 may be the same or similar to telephone subsystem 106 of FIG. 1 and/or PBX 260 of FIG. 2. For example, telephone subsystem 1306 may include a call forwarding feature 1312, a remote call forwarding feature 1328, a call monitoring feature 1330, a call deflection feature 1332, a processor 1318, and a memory 1320. Telephone subsystem 1306 may also communicate with one or more telephones 1310.

In the illustrated embodiment, packet subsystem 1304 includes a voice over packet client 1350, a gateway 1358, and a gatekeeper 1366. Client 1350 is coupled to gatekeeper 1366 and gateway 1358. Client 1350 facilitates the communication of packet voice information to telephone subsystem 1306. Client 1350 may, for example, receive voice information, packetize the information, and communicate the packets to gateway 1358. Client 1350 may also receive packets of voice information from gateway 1358 and extract the information. In one embodiment, client 1350 may operate in an active state or a non-active state. The active state indicates that calls directed at a telephone 1310 associated with client 1350 should be forwarded to client 1350. The non-active state indicates that calls directed at client 1350 should be forwarded to the telephone 1310 associated with client 1350. Client 1350 may comprise any hardware, software, firmware, or combination thereof operable to provide packet voice services in system 1300. Client 1350 may, for example, comprise a voice over packet telephone, a computing device, or a gateway operable to communicate with another communications system. In a particular embodiment, client 1350 comprises a Wireless Adjunct Internet Platform operable to facilitate communication between packet subsystem 1304 and a wireless system.

Gateway 1358 and gatekeeper 1366 may be the same or similar to gateway 258 and gatekeeper 266, respectively, of FIG. 2. In the illustrated embodiment, gatekeeper 1366 is coupled to client 1350, gateway 1358, and telephone subsystem 1306. Gatekeeper 1366 is operable to communicate signaling information to client 1350, gateway 1358, and telephone subsystem 1306. Gatekeeper 1366 may communicate the signaling information to telephone subsystem 1306 over CTI interface 1316 or through gateway 1358. Gatekeeper 1366 is also operable to instruct telephone subsystem 1306 to forward a call for a telephone 1310 to a client 1350 when client 1350 is in the active state. Gatekeeper 1366 is further operable to instruct gateway 1358 to forward a call for a client 1350 to a telephone 1310 when client 1350 is in the non-active state. Gatekeeper 1366 may comprise any hardware, software, firmware, or combination thereof operable to instruct telephone subsystem 1306 and/or gateway 1358 to forward calls in system 1300.

Gateway 1358 is coupled to client 1350, gatekeeper 1366, and telephone subsystem 1306. Gateway 1358 facilitates communication between client 1350 and telephone subsystem 1306. Gateway 1358 may, for example, receive packets containing voice information from client 1350, extract the voice information, and communicate the information to telephone subsystem 1306. Gateway 1358 may also receive voice information from telephone system 1306, packetize the information, and communicate the packets to client 1350. In addition, gateway 1358 may facilitate the communication of signaling information between gatekeeper 1366 and telephone subsystem 1306 over interface 1314. Gateway 1358 may comprise any hardware, software, firmware, or combination thereof operable to facilitate communication between client 1350 and telephone subsystem 1306.

In one aspect of operation, when client 1350 is activated, client 1350 registers with gatekeeper 1366. Gatekeeper 1366 instructs telephone subsystem 1306 to forward calls directed at the telephone 1310 associated with client 1350 to gateway 1358. Gatekeeper 1366 may also instruct gateway 1358 not to forward calls for client 1350 to telephone subsystem 1306. When telephone subsystem 1306 receives a call directed at client 1350 or the associated telephone 1310, telephone subsystem 1306 forwards the call to gateway 1358, which communicates the call to client 1350. If a second client 1350 attempts to call the first client 1350, the call may be routed through packet subsystem 1304 without being routed through telephone subsystem 1306.

When client 1350 is deactivated, or enters the non-active state, client 1350 deregisters with gatekeeper 1366. Gatekeeper 1366 instructs telephone subsystem 1306 to stop forwarding calls to client 1350, and gatekeeper 1366 instructs gateway 1358 to forward calls for client 1350 to the associated telephone 1310. If packet subsystem 1304 receives a call for the deactivated client 1350, such as from another client 1350, gatekeeper 1366 routes the call through telephone subsystem 1306 to the telephone 1310 associated with the deactivated client 1350.

In a particular embodiment, client 1350 comprises a gateway to a wireless network, such as a Wireless Adjunct Internet Platform. In this embodiment, client 1350 may operate in an active state when a mobile station is registered with the wireless network. Similarly, client 1350 may operate in a non-active state when no mobile stations are registered with the wireless network.

Gatekeeper 1366 may use any suitable method for instructing telephone subsystem 1306 to forward calls for a telephone 1310 to gateway 1358. Gatekeeper 1366 may, for example, use method 1400 illustrated in FIG. 14, or the methods illustrated in FIGS. 3–6 where client 1350 takes the place of the mobile station in methods 300–600. Also, system 1300 may use any suitable method for maintaining call forwarding synchronization. This may include, for example, system 1300 using the methods illustrated in FIGS. 7–11, with client 1350 taking the place of the mobile station in methods 700–1100.

Although FIG. 13 illustrates one embodiment of system 1300, various changes may be made without departing from the scope of the present invention. For example, any number and/or types of clients 1350 may be coupled to a gatekeeper 1366 and a gateway 1358. Also, any number of gatekeepers 1366 and/or gateways 1358 may be coupled to telephone subsystem 1306. Other changes may be made to system 1300 without departing from the scope of the present invention.

Figure 14:
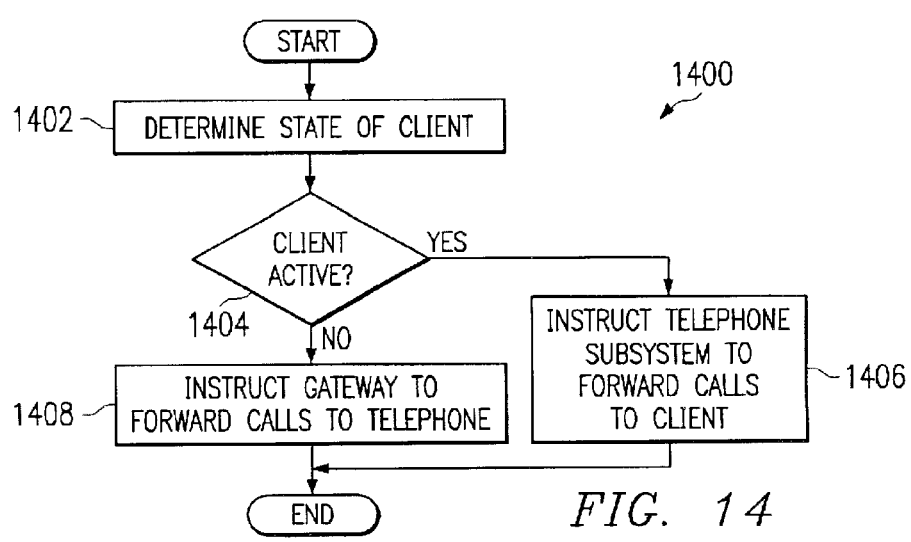
FIG. 14 is a flow diagram illustrating another exemplary method for call forwarding in a communication system.

FIG. 14 is a flow diagram illustrating another exemplary method 1400 for call forwarding in a communications system. System 1300 determines the state of a client 1350 at step 1402. This may include, for example, gatekeeper 1366 determining if the client 1350 is registered with gatekeeper 1366. Registered clients 1350 may be in an active state, while unregistered clients 1350 are in the non-active state. System 1300 determines if client 1350 is in an active state at step 1404. If client 1350 is in an active state, system 1300 instructs telephone subsystem 1306 to forward calls directed at a telephone 1310 to the associated client 1350 at step 1406. This may include, for example, gatekeeper 1366 instructing telephone subsystem 1306 to forward calls for telephone 1310 using call forwarding feature 1312, remote call forwarding feature 1328, call monitoring feature 1330, and/or call deflection feature 1332. At this point, system 1300 may route calls for a user of client 1350 to client 1350, whether the calls are directed at client 1350 or telephone 1310.

If client 1350 is in the non-active state at step 1404, system 1300 instructs gateway 1358 to forward calls for client 1350 to telephone 1310 at step 1408. This may include, for example, gatekeeper 1366 instructing gateway 1358 to forward calls for client 1350 to telephone subsystem 1306. At this point, system 1300 routes calls for the user of client 1350 to the associated telephone 1310, whether the calls are directed at client 1350 or telephone 1310.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A system for call forwarding, comprising:
   a telephone subsystem operable to communicate with a telephonic device;
   a wireless subsystem operable to:
      communicate with a mobile station, the mobile station associated with the telephonic device;
      register the mobile station; and
   a packet subsystem operable to transport packets and coupled to the telephone subsystem and the wireless subsystem, the packet subsystem further operable to:
      determine that the mobile station has registered with the wireless subsystem; and
      provide an instruction to the telephone subsystem in response to determining that the mobile station has registered with the wireless subsystem;
   the telephone system further operable to:
      receive the instruction from the packet subsystem; and
      in response to receiving the instruction, forward a telephone call directed at the telephonic device to the packet subsystem, the forwarding triggered by the mobile station registering with the wireless subsystem; and
   the packet subsystem further operable to:
      communicate the telephone call to the wireless subsystem for delivery to the mobile station;
      determine that the mobile station has deregistered with the wireless subsystem; and
      provide a second instruction to the telephone subsystem in response to determining that the mobile station has deregistered with the wireless subsystem, the second instruction instructing the telephone system to forward a telephone call directed at the mobile station to the telephonic device, the forwarding triggered by the mobile station deregistering with the wireless subsystem.

2. The system of claim 1, wherein the packet subsystem is operable to instruct the telephone subsystem to forward the telephone call by instructing the telephone subsystem to invoke at least one of a call forwarding feature, a call monitoring feature, a call deflection feature, and a remote call forwarding feature.

3. The system of claim 2, wherein the packet subsystem is operable to instruct the telephone subsystem to invoke one or more of the features using at least one of a Computer Telephony Integration interface to the telephone subsystem, a signaling channel in a trunk interface o the telephone subsystem, a signaling channel in a line interface to the telephone subsystem, an administration port in the telephone subsystem, a teleworking server coupled to the telephone subsystem, and a telephone emulator coupled to the telephone subsystem.

4. The system of claim 1, wherein the packet subsystem comprises:
   a wireless adjunct internet platform operable to communicate with at least one base station, the base station operable to communicate with the mobile station;
   a gateway operable to communicate with the wireless adjunct internet platform and the telephone subsystem; and
   a gatekeeper operable to generate signaling messages to control the telephone subsystem.

5. The system of claim 1, wherein:
   the telephone subsystem comprises a private branch exchange;
   the wireless subsystem supports a Global System for Mobile communication (GSM) standard; and
   the packet subsystem supports an International Telecommunications Union-Telecommunications (ITU-T) H.323 standard.

6. A method for call forwarding, comprising:
   allowing a telephone subsystem to direct a first telephone call to a telephonic device when a mobile station is not registered, the mobile station associated with the telephonic device;
   determining that the mobile station has registered with a wireless subsystem, the wireless subsystem coupled to the telephone subsystem by a packet subsystem operable to transport packets; and
   proving an instruction to the telephone subsystem in response to determining that the mobile station has registered with the wireless subsystem, the telephone system further operable to receive the instruction from the packet subsystem, and, in response to receiving the instruction, forward a second telephone call directed at the telephonic device to the packet subsystem, the forwarding triggered by the mobile station registering with the wireless subsystem, the packet subsystem further operable to receive the second telephone call from the telephone subsystem and to communicate the second telephone call to the wireless subsystem for delivery to the mobile station;
   determining that the mobile station has deregistered with the wireless subsystem; and
   providing a second instruction to the telephone subsystem in response to determining that the mobile station has deregistered with the wireless subsystem, the second instruction instructing the telephone system to forward a telephone call directed at the mobile station to the telephonic device, the forwarding triggered by the mobile station deregistering with the wireless subsystem.

7. The method of claim 6, wherein instructing the telephone subsystem to forward the second telephone call comprises instructing the telephone subsystem to invoke at least one of a call forwarding feature, a call monitoring feature, a call deflection feature, and a remote call forwarding feature.

8. The method of claim 7, wherein instructing the telephone subsystem to invoke at least one of the features comprises instructing the telephone subsystem using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem.

9. The method of claim 6, wherein the mobile station comprises a first mobile station; and further comprising:
receiving a third telephone call from a second mobile station directed at the first mobile station; and
routing the third telephone call through the wireless subsystem and the packet subsystem without routing the third telephone call through the telephone subsystem.

10. The method of claim 6, wherein instructing the telephone subsystem to forward the second telephone call comprises instructing the telephone subsystem to forward the second telephone call to a gateway in the packet subsystem.

11. A system for call forwarding, comprising:
at least one computer processable medium; and
logic encoded on the at least one computer processable medium and operable to:
allow a telephone subsystem to direct a first telephone call to a telephonic device when a mobile station is not registered, the mobile station associated with the telephonic device;
determine that the mobile station has registered with a wireless subsystem, the wireless subsystem coupled to the telephone subsystem by a packet subsystem operable to transport packets; and
provide an instruction to the telephone subsystem in response to determining that the mobile station has registered with the wireless subsystem, the telephone system further operable to receive the instruction from the packet subsystem, and, in response to receiving the instruction, forward a second telephone call directed at the telephonic device to the packet subsystem, the forwarding triggered by the mobile station registering with the wireless subsystem, the packet subsystem further operable to receive the second telephone call from the telephone subsystem and to communicate the second telephone call to the wireless subsystem for delivery to the mobile station;
determine that the mobile station has deregistered with the wireless subsystem; and
provide a second instruction to the telephone subsystem in response to determining that the mobile station has deregistered with the wireless subsystem, the second instruction instructing the telephone system to forward a telephone call directed at the mobile station to the telephonic device, the forwarding triggered by the mobile station deregistering with the wireless subsystem.

12. The system of claim 11, wherein the logic is operable to instruct the telephone subsystem to forward the second telephone call by instructing the telephone subsystem to invoke at least one of a call forwarding feature, a call monitoring feature, a call deflection feature, and a remote call forwarding feature.

13. The system of claim 12, wherein the logic is operable to instruct the telephone subsystem to invoke one or mare of the features using at least one of a Computer Telephony Integration interface to the telephone subsystem, a signaling channel in a trunk interface to the telephone subsystem, a signaling channel in a line interface to the telephone subsystem, an administration part in the telephone subsystem, a teleworking server coupled to the telephone subsystem, and a telephone emulator coupled to the telephone subsystem.

14. The system of claim 11, wherein the mobile station comprises a first mobile station; and wherein the logic is further operable to route a third telephone call from a second mobile station directed at the first mobile station through the wireless subsystem and the packet subsystem without routing the third telephone call through the telephone subsystem.

15. The system of claim 11, wherein the logic is operable to instruct the telephone subsystem to forward the second telephone call to a gateway in the packet subsystem.

16. A system for call forwarding, comprising:
a telephone subsystem operable to communicate with a telephonic device;
a wireless subsystem operable to communicate with a mobile station, the wireless subsystem comprising at least one base station operable to communicate with the mobile station over a wireless interface, the mobile station associated with the telephonic device; and
a packet subsystem coupled to the telephone subsystem and the wireless subsystem, the packet subsystem comprising:
a wireless adjunct internet platform operable to communicate with the base station;
a gateway operable to communicate with the wireless adjunct internet platform and the telephone subsystem;
a gatekeeper operable to:
determine that the mobile station has registered with the wireless subsystem; and
instruct the telephone subsystem in response to determining that the mobile station has registered with the wireless subsystem, the telephone system further operable to receive the instruction from the packet subsystem, and, in response to receiving the instruction, forward a first telephone call directed at the telephonic device to the gateway;
the gatekeeper further operable to instruct the telephone subsystem to forward the first telephone call by instructing the telephone subsystem to invoke at least one of a call forwarding feature, a call monitoring feature, a call deflection feature, and a remote call forwarding feature;
the gatekeeper operable to instruct the telephone subsystem to invoke one or more of the features using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem; and
the gatekeeper further operable to instruct the gateway to forward a second telephone call directed at the mobile station to the telephonic device associated with the mobile station after the mobile station deregisters.

17. A method for call forwarding, comprising:
allowing a telephone subsystem to direct a first telephone call to a telephonic device when a first mobile station is not registered, the first mobile station associated with the telephonic device;
determining that the first mobile station has registered with a wireless subsystem, the wireless subsystem coupled to the telephone subsystem by a packet subsystem operable to transport packets;

in response to determining that the first mobile station has registered with the wireless subsystem, providing an instruction to the telephone subsystem to invoke at least one of a call forwarding feature, a call monitoring feature, a call deflection feature, and a remote call forwarding feature using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem, the telephone system further operable to receive the instruction from the packet subsystem, and, in response to receiving the instruction, forward a second telephone call directed at the telephonic device to a gateway in the packet subsystem, the forwarding triggered by the first mobile station registering with the wireless subsystem the gateway operable to receive the second telephone call and to communicate the second telephone call to the wireless subsystem for delivery to the mobile station;

routing a third telephone call from a second mobile station directed at the first mobile station through the wireless subsystem and the packet subsystem without routing the third telephone call through the telephone subsystem;

determining that the first mobile station has deregistered with the wireless subsystem; and providing a second instruction to the telephone subsystem in response to determining that the first mobile station has deregistered with the wireless subsystem, the second instruction instructing the gateway to forward a fourth telephone call directed at the first mobile station to the telephonic device associated with the first mobile station after the first mobile station deregisters, the forwarding triggered by first the mobile station deregistering with the wireless subsystem.

18. A system for call forwarding, comprising:

at least one computer processable medium; and logic encoded on the at least one computer processable medium and operable to:
  allow a telephone subsystem to direct a first telephone call to a telephonic device when a first mobile station is not registered, the first mobile station associated with the telephonic device;
  determine that the first mobile station has registered with a wireless subsystem, the wireless subsystem coupled to the telephone subsystem by a packet subsystem operable to transport packets;
  in response to determining that the first mobile station has registered with the wireless subsystem, provide an instruction the telephone subsystem to invoke at least one of a call forwarding feature, a call monitoring feature, a call deflection feature, and a remote call forwarding feature using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem, the telephone system further operable to receive the instruction from the packet subsystem, and, in response to receiving the instruction, forward a second telephone call directed at the telephonic device to a gateway in the packet subsystem, the forwarding triggered by the first mobile station registering with the wireless subsystem, the gateway operable to receive the second telephone call and to communicate the second telephone call to the wireless subsystem for delivery to the mobile station;

route a third telephone call from a second mobile station directed at the first mobile station through the wireless subsystem and the packet subsystem without routing the third telephone call through the telephone subsystem;

determine that the first mobile station has deregistered with the wireless subsystem; and provide a second instruction to the telephone subsystem in response to determining that the first mobile station has deregistered with the wireless subsystem, the second instruction instructing the gateway to forward a fourth telephone call directed at the first mobile station to the telephonic device associated with the first mobile station after the first mobile station deregisters, the forwarding triggered by the first mobile station deregistering with the wireless subsystem.

19. A system for call forwarding, comprising:

a telephone subsystem operable to communicate with a telephonic device;

a client in a packet-switched network associated with the telephonic device and operable to operate in an active state and a non-active state, the active state indicating that calls to the telephonic device should be forwarded to the client, the non-active state indicating that calls to the client should be forwarded to the telephonic device;

a gateway operable to communicate with the client and the telephone subsystem; and a gatekeeper operable to:
  register the client; and
  provide an instruction to the telephone subsystem in response to registering the client;

the telephone subsystem further operable to:
  receive the instruction from the packet subsystem; and
  in response to receiving the instruction, forward a first telephone call directed at the telephonic device to the gateway, the forwarding triggered by the client registering with the wireless subsystem; and the gatekeeper further operable to:
  determine that the client has deregistered with the wireless subsystem; and
  provide a second instruction to the telephone subsystem in response to determining that the client has deregistered with the wireless subsystem, the second instruction instructing the gateway to forward a second telephone call directed at the client to the telephone subsystem when the client is operating in the non-active state, the forwarding triggered by the client deregistering with the wireless subsystem.

20. The system of claim 19, wherein the gatekeeper is operable to instruct the telephone subsystem to forward the first telephone call by instructing the telephone subsystem to invoke at least one of a call forwarding feature, a call monitoring feature, a call deflection feature, and a remote call forwarding feature.

21. The system of claim 20, wherein the gatekeeper is operable to instruct the telephone subsystem to invoke one or more of the features using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem.

22. The system of claim 19, wherein:
the client comprises a gateway to a wireless subsystem, the wireless subsystem operable to communicate with a mobile station;
the client operates in the active state when the mobile station is registered; and
the client operates in the non-active state when the mobile station is unregistered.

23. The system of claim 19, wherein the client comprises at least one of a voice over packet telephone, a computing device, and a gateway operable to communicate with another communication system.

24. A method for call forwarding, comprising:
determining whether a client in a packet-switched network and associated with a telephonic device is operating in an active state or a non-active state, the active state indicating that calls to the telephonic device should be forwarded to the client, the non-active state indicating the calls to the client should be forwarded to the telephonic device, the telephonic device operable to communicate with a telephone subsystem;
registering the client;
providing an instruction to the telephone subsystem in response to registering the client, the telephone subsystem further operable to receive the instruction from the packet subsystem, and in response to receiving the instruction, forward a first telephone call directed at the telephonic device to a gateway coupled to the client, the forwarding triggered by registering the client the gateway operable to receive the first telephone call from the telephone subsystem and to communicate the first telephone call to the client;
deregistering the client; and
providing a second instruction to the telephone subsystem in response to deregistering the client, the second instruction instructing the gateway to forward a second telephone call directed at the client to the telephone subsystem if the client is in the non-active state, the forwarding triggered by deregistering the client.

25. The method of claim 24, wherein:
the client comprises a gateway to a wireless subsystem, the wireless subsystem operable to communicate with a mobile station;
the client operates in the active state when the mobile station is registered; and
the client operates in the non-active state when the mobile station is unregistered.

26. The method of claim 24, wherein the client comprises at least one of a voice over packet telephone, a computing device, and a gateway operable to communicate with another communication system.

27. The method of claim 24, wherein instructing the telephone subsystem to forward the first telephone call comprises instructing the telephone subsystem to invoke at least one of a call forwarding feature, a call monitoring feature, a call deflection feature, and a remote call forwarding feature.

28. The method of claim 27, wherein instructing the telephone subsystem to invoke at least one of the features comprises instructing the telephone subsystem using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem.

29. A system for call forwarding, comprising:
at least one computer processable medium; and
logic encoded on the at least one computer processable medium and operable to:
determine whether a client in a packet-switched network and associated with a telephonic device is operating in an active state and a non-active state, the active state indicating that calls to the telephonic device should be forwarded to the client, the non-active state indicating the calls to the client should be forwarded to the telephonic device, the telephonic device operable to communicate with a telephone subsystem;
register the client;
provide an instruction to the telephone subsystem in response to registering the client, the telephone subsystem further operable to receive the instruction from the packet subsystem; and in response to receiving the instruction, forward a first telephone call directed at the telephonic device to a gateway coupled to the client, the forwarding triggered by registering the client, the gateway operable to receive the first telephone call from the telephone subsystem and to communicate the first telephone call to the client;
deregister the client; and
provide a second instruction to the telephone subsystem in response to deregistering the client, the second instruction instructing the gateway to forward a second telephone call directed at the client to the telephone subsystem if the client is in the non-active state, the forwarding triggered by deregistering the client.

30. The system of claim 29, wherein:
the client comprises a gateway to a wireless subsystem, the wireless subsystem operable to communicate with a mobile station;
the client operates in the active state when the mobile station is registered; and
the client operates in the non-active state when the mobile station is unregistered.

31. The system of claim 29, wherein the client comprises at least one of a voice over packet telephone, a computing device, and a gateway operable to communicate with another communication system.

32. The system of claim 29, wherein the logic is operable to instruct the telephone subsystem to forward the first telephone call by instructing the telephone subsystem to invoke at least one of a call forwarding feature, a call monitoring feature, a call deflection feature, and a remote call forwarding feature.

33. The system of claim 32, wherein the logic is operable to instruct the telephone subsystem to invoke one or more of the features using at least one of a Computer Telephony Integration interface to the telephone subsystem, a signaling channel in a trunk interface to the telephone subsystem, a signaling channel in a line interface to the telephone subsystem, an administration port in the telephone subsystem, a teleworking server coupled to the telephone subsystem, and a telephone emulator coupled to the telephone subsystem.

* * * * *